United States Patent
Crandall et al.

(10) Patent No.: US 11,587,002 B1
(45) Date of Patent: Feb. 21, 2023

(54) SYSTEMS AND METHODS FOR AUTOMATED CARRIER ROUTING INCLUDING DESTINATION AND CARRIER SELECTION

(71) Applicant: G4S Retail Solutions (USA) Inc., Jupiter, FL (US)

(72) Inventors: Shellie Crandall, Palm Beach Gardens, FL (US); Brian McCabe, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 8 days.

(21) Appl. No.: 17/243,183

(22) Filed: Apr. 28, 2021

Related U.S. Application Data

(60) Provisional application No. 63/018,071, filed on Apr. 30, 2020.

(51) Int. Cl.
```
G06Q 10/06      (2012.01)
G06Q 10/0631    (2023.01)
G06Q 10/0835    (2023.01)
G06N 20/00      (2019.01)
G06Q 10/083     (2023.01)
G06Q 30/0204    (2023.01)
```
(52) U.S. Cl.
CPC ....... G06Q 10/06312 (2013.01); G06N 20/00 (2019.01); G06Q 10/06315 (2013.01); G06Q 10/0835 (2013.01); G06Q 10/0838 (2013.01); G06Q 30/0205 (2013.01)

(58) Field of Classification Search
CPC ....... G06Q 10/06312; G06Q 10/06315; G06Q 10/0835; G06Q 10/0838; G06Q 30/0205; G06N 20/00
USPC ....................................................... 705/7.22
See application file for complete search history.

(56) References Cited

U.S. PATENT DOCUMENTS

| | | | |
|---|---|---|---|
| 7,610,215 B1 | 10/2009 | Folk et al. | |
| 7,635,085 B2 | 12/2009 | Brown et al. | |
| 7,900,829 B1 | 3/2011 | Folk et al. | |
| 7,940,176 B2 | 5/2011 | Bohen et al. | |
| 7,950,512 B2 | 5/2011 | Folk et al. | |
| 7,954,699 B1 | 6/2011 | Sanders et al. | |

(Continued)

OTHER PUBLICATIONS

Optimal ATM replenishment policies under demand uncertainty. Ekinci, Yeliz; Serban, Nicoleta; Duman, Ekrem. Operational Research: 1-31. Heidelberg: Springer Nature B.V. (Mar. 2019).*

(Continued)

*Primary Examiner* — Timothy Padot
(74) *Attorney, Agent, or Firm* — Alston & Bird LLP

(57) ABSTRACT

In response to a request for currency transportation services for a retail location (e.g., providing currency to the retail location or picking-up currency from the retail location), one or more currency transportation requirements are identified and provided as input to a currency transportation model to identify and/or assign a carrier and/or a financial institution location to serve as a final destination or an origin for the currency transportation services. The output of the currency transportation model is utilized to initiate the currency transportation services by transmitting a notification to a carrier-operated computing entity to schedule the requested currency transportation services.

21 Claims, 7 Drawing Sheets

(56) References Cited

U.S. PATENT DOCUMENTS

| | | |
|---|---|---|
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 | 2/2012 | Sanders et al. |
| 8,141,772 B1 | 3/2012 | Folk et al. |
| 8,157,078 B1 | 4/2012 | Folk et al. |
| 8,172,067 B1 | 5/2012 | Folk et al. |
| 8,175,970 B1 | 5/2012 | Mon et al. |
| 8,177,132 B1 | 5/2012 | Bohen et al. |
| 8,181,854 B1 | 5/2012 | Folk et al. |
| 8,181,856 B1 | 5/2012 | Folk et al. |
| 8,196,826 B2 | 6/2012 | Folk et al. |
| 8,201,680 B1 | 6/2012 | Folk et al. |
| 8,210,429 B1 | 7/2012 | Bohen et al. |
| 8,214,257 B1 | 7/2012 | Folk et al. |
| 8,225,988 B1 | 7/2012 | Bohen et al. |
| 8,227,936 B1 | 7/2012 | Folk et al. |
| 8,260,669 B1 | 9/2012 | Folk et al. |
| 8,272,563 B1 | 9/2012 | Folk et al. |
| 8,274,364 B1 | 9/2012 | Bohen et al. |
| 8,327,995 B1 | 12/2012 | Folk et al. |
| 8,346,640 B1 | 1/2013 | Sanders et al. |
| 8,387,874 B1 | 3/2013 | Bohen et al. |
| 8,396,278 B2 | 3/2013 | Jones et al. |
| 8,401,965 B2 | 3/2013 | Johnson et al. |
| 8,407,119 B2 | 3/2013 | Folk et al. |
| 8,430,303 B1 | 4/2013 | Sanders et al. |
| 8,517,257 B1 | 8/2013 | Folk et al. |
| 8,556,166 B1 | 10/2013 | Folk et al. |
| 8,561,885 B1 | 10/2013 | Folk et al. |
| 8,571,948 B1 | 10/2013 | Nichols et al. |
| 8,600,842 B1 | 12/2013 | Sanders et al. |
| 8,601,771 B2 | 12/2013 | Folk et al. |
| 8,602,295 B1 | 12/2013 | Sanders et al. |
| 8,640,945 B1 | 2/2014 | McCormick |
| 8,781,903 B1 | 7/2014 | Bohen et al. |
| 8,812,366 B2 | 8/2014 | Folk et al. |
| 8,812,394 B1 | 8/2014 | Folk et al. |
| 8,909,547 B2 | 12/2014 | Bohen et al. |
| 8,925,797 B1 | 1/2015 | Bohen et al. |
| 9,004,352 B1 | 4/2015 | Graef et al. |
| 9,064,366 B1 | 6/2015 | Folk et al. |
| 9,070,125 B1 | 6/2015 | Folk et al. |
| 9,098,960 B1 | 8/2015 | Folk et al. |
| 9,311,671 B2 | 4/2016 | Folk et al. |
| 9,547,848 B2 | 1/2017 | Folk et al. |
| 9,697,493 B2 | 7/2017 | Folk et al. |
| 9,715,793 B1 | 7/2017 | Brancaccio |
| 2004/0024769 A1* | 2/2004 | Forman ............... G06K 9/6282 |
| 2004/0030622 A1* | 2/2004 | Ramos ................. G06Q 40/00 705/35 |
| 2004/0217162 A1* | 11/2004 | Chigira ................. G06Q 10/08 235/379 |
| 2005/0027626 A1 | 2/2005 | Garcia |
| 2005/0289030 A1 | 12/2005 | Smith |
| 2009/0070263 A1 | 3/2009 | Davis et al. |
| 2011/0060639 A1 | 3/2011 | Garcia |
| 2011/0225087 A1* | 9/2011 | Agrawal ............... G16B 25/00 705/43 |
| 2011/0258090 A1 | 10/2011 | Bosch et al. |
| 2012/0073482 A1 | 3/2012 | Meeker et al. |
| 2013/0191196 A1 | 7/2013 | Cecala |
| 2013/0232064 A1 | 9/2013 | Bosch |
| 2013/0346135 A1 | 12/2013 | Siemens et al. |
| 2014/0195396 A1* | 7/2014 | Bhakta ................. G06Q 40/02 705/35 |
| 2014/0279675 A1 | 9/2014 | Wiig et al. |
| 2014/0353375 A1 | 12/2014 | Turocy et al. |
| 2016/0155090 A1* | 6/2016 | Folk .................... G06Q 20/10 705/39 |
| 2017/0039819 A1* | 2/2017 | Angus ................ G06Q 10/087 |
| 2017/0061561 A1 | 3/2017 | Cha |
| 2017/0232300 A1 | 8/2017 | Tran et al. |
| 2018/0005196 A1 | 1/2018 | Crandall et al. |
| 2018/0078843 A1 | 3/2018 | Tran et al. |
| 2018/0211190 A1* | 7/2018 | Guo ................. G06Q 10/08355 |
| 2018/0218323 A1 | 8/2018 | Nguyen |
| 2018/0240190 A1 | 8/2018 | Schumacher |
| 2019/0220839 A1 | 7/2019 | Oliynyk |

OTHER PUBLICATIONS

AI-based forecasting tool reduces cash replenishment trips. ATM Marketplace. News Features [Louisville] Sep. 8, 2020.*

* cited by examiner

| City | State | Zip Code | Banking Partner | Bank Vault City | Bank Vault State | Bank Vault Vendor | Sourcing | Carrier 1 Dist. | Carrier 2 Dist. | Carrier 3 Dist. | Scenario |
|---|---|---|---|---|---|---|---|---|---|---|---|
| Irmo | SC | 29063-2875 | BANK A | Charlotte | NC | BANK A | Insourced | 15 | 9 | 12 | 3 |
| Irmo | SC | 29063-2875 | BANK A | Charlotte | NC | BANK A | Insourced | 15 | 9 | 12 | 3 |
| Columbia | SC | 29204-4028 | BANK A | Charlotte | NC | BANK A | Insourced | 5 | 2 | 7 | 3 |
| Myrtle Beach | SC | 29572-4006 | BANK A | Myrtle Beach | SC | BANK A | Insourced | 94 | 81 | 7 | 1 |
| Myrtle Beach | SC | 29572-4006 | BANK A | Myrtle Beach | SC | BANK A | Insourced | 94 | 81 | 7 | 1 |
| North Myrtle Beach | SC | 29582-3037 | BANK A | Myrtle Beach | SC | BANK A | Insourced | 102 | 78 | 15 | 1 |
| North Myrtle Beach | SC | 29582-3037 | BANK A | Myrtle Beach | SC | BANK A | Insourced | 102 | 78 | 15 | 1 |
| Murrells Inlet | SC | 29576-7624 | BANK A | Myrtle Beach | SC | BANK A | Insourced | 76 | 79 | 10 | 1 |
| Murrells Inlet | SC | 29576-7624 | BANK A | Myrtle Beach | SC | BANK A | Insourced | 76 | 79 | 10 | 1 |
| Myrtle Beach | SC | 29579-4109 | BANK A | Myrtle Beach | SC | BANK A | Insourced | 86 | 82 | 5 | 1 |
| Myrtle Beach | SC | 29579-4109 | BANK A | Myrtle Beach | SC | BANK A | Insourced | 86 | 82 | 5 | 1 |

FIG. 7

SYSTEMS AND METHODS FOR AUTOMATED CARRIER ROUTING INCLUDING DESTINATION AND CARRIER SELECTION

CROSS-REFERENCE TO RELATED APPLICATIONS

This patent application claims priority from U.S. Provisional Appl. Ser. No. 63/018,071, filed Apr. 30, 2020 which is incorporated herein by reference in its entirety.

BACKGROUND

Currency transportation services provided to retail establishments (and/or to other cash-based businesses) involves the movement of physical currency (paper cash, coins, checks, and/or other negotiable instruments) between a retail location (e.g., a store) and a financial institution (e.g., a bank). Retail locations may collect a large amount of cash a result of successful retail transactions with customers and/or those retail locations may require replenishment of certain currency denominations that are commonly provided to customers as change during those retail transactions (e.g., coins, low-denomination bills, such as $1 bills, and/or the like). Although some small retailers may rely on their own employees to make periodic trips to a financial institution to deposit cash and/or to pick up replenishments of certain cash denominations, many retail establishments rely on third party carriers, such as carrier provided armored transportation services to move cash between their retail location and financial institution locations. While these currency transportation services often combine trips to multiple retail locations into a single route in an effort to save costs, these carriers do not have adequate visibility into the requirements of certain retailers to enable computing systems to automatically optimize carrier routes while maintaining compliance with all retailer requirements. Accordingly, a need constantly exists for additional innovations to further optimize systems and methods for transporting currency between retailers and financial institutions.

BRIEF SUMMARY

Modelling, such as machine-learning based modelling, is provided to automatically identify and/or assign currency transportation services to transport currency to/from a retail location (specifically, within a cash handling device) and a financial institution location in response to a currency transportation service request. To optimize the currency transportation services provided to a particular retail location, a model incorporates one or more currency transportation requirements, which may place limitations on the carrier and/or financial institution location that may be utilized as a part of the currency transportation services. The output of the model is a selection and/or an assignment of a particular carrier to carry out the currency transportation services and/or a particular financial institution location to service as a final destination (or an origin) of currency transportation services while ensuring that currency transportation requirements are satisfied.

Various embodiments are directed to a computer-implemented method comprising: receiving, via one or more processors, a request for currency transportation services associated with a cash handling device, wherein the request for currency transportation services comprises a retail location identifier; retrieving, from one or more memory storage areas, a location-specific retail profile comprising currency transportation requirement data associated with the cash handling device; retrieving, based at least in part on the location-specific retail profile, scheduling data for previously scheduled currency transportation services for the cash handling device; providing, via the one or more processors, one or more of: (a) at least a portion of the request for currency transportation services, (b) at least a portion of the currency transportation requirement data, or (c) at least a portion of the scheduling data, as input to a machine-learning based currency transportation model for automatically initiating a currency transportation service to address the request for currency transportation services; executing, via the one or more processors, the machine-learning based currency transportation model to automatically assign a carrier and a final destination for transporting currency from the cash handling device, wherein the automatically assigned carrier and final destination comply with the at least a portion of the currency transportation requirement data; transmitting, via the one or more processors, a notification for provision to a carrier-operated computing entity to initiate the currency transportation service; and updating, via the one or more processors, the scheduling data based at least in part on the currency transportation service.

In various embodiments, the method further comprises: retrieving, based at least in part on the location-specific retail profile, a master retail profile comprising additional currency transportation requirement data; and wherein the automatically assigned carrier and final destination comply with the additional currency transportation requirement data. Moreover, the additional currency transportation requirement data may comprise aggregate currency transportation requirement data establishing currency transportation requirements for currency transportation services provided for a plurality of retail locations; and wherein retrieving scheduling data for previously scheduled currency transportation services for the cash handling device additionally comprises retrieving scheduling data for previously scheduled currency transportation services for each of the plurality of retail locations. In certain embodiments, the additional currency transportation requirement data identifies a maximum percentage of currency transported from the plurality of retail locations by a single carrier. Moreover, the currency transportation requirement data may identify a maximum percentage of currency transported from the cash handling device to a single final destination. In certain embodiments, the currency transportation requirement data identifies a maximum percentage of currency transported from the cash handling device to final destinations located within a defined geographical area. Moreover, in various embodiments, the scheduling data comprises historical data identifying previously completed currency transportation services and pending data identifying uncompleted currency transportation services. In certain embodiments, the machine-learning based transportation model is configured to predict future currency transportation service requests and to minimize transportation costs across a plurality of currency transportation services from the cash handling device based at least in part on the predicted future currency transportation service requests and the currency transportation service request. In various embodiments, the method further comprises providing one or more carrier profiles as input to the machine-learning based transportation model, wherein the one or more carrier profiles comprise routing data indicative of one or more existing carrier routes. In certain embodiments, the method further comprises transmitting a notification for provision to the cash handling device confirming the currency transportation service.

Certain embodiments are directed to a system comprising one or more memory storage areas; and one or more processors. The one or more processors are collectively configured to: receive a request for currency transportation services associated with a cash handling device, wherein the request for currency transportation services comprises a retail location identifier; retrieve, from the one or more memory storage areas, a location-specific retail profile comprising currency transportation requirement data associated with the cash handling device; retrieve, based at least in part on the location-specific retail profile, scheduling data for previously scheduled currency transportation services for the cash handling device; provide one or more of: (a) at least a portion of the request for currency transportation services, (b) at least a portion of the currency transportation requirement data, or (c) at least a portion of the scheduling data, as input to a machine-learning based currency transportation model for automatically initiating a currency transportation service to address the request for currency transportation services; execute the machine-learning based currency transportation model to automatically assign a carrier and a final destination for transporting currency from the cash handling device, wherein the automatically assigned carrier and final destination comply with the at least a portion of the currency transportation requirement data; transmit a notification for provision to a carrier-operated computing entity to initiate the currency transportation service; and update the scheduling data based at least in part on the currency transportation service.

In various embodiments, the one or more processors are further configured to: retrieve, based at least in part on the location-specific retail profile, a master retail profile comprising additional currency transportation requirement data; and wherein the automatically assigned carrier and final destination comply with the additional currency transportation requirement data. In various embodiments, the additional currency transportation requirement data comprises aggregate currency transportation requirement data establishing currency transportation requirements for currency transportation services provided for a plurality of retail locations; and wherein retrieving scheduling data for previously scheduled currency transportation services for the cash handling device additionally comprises retrieving scheduling data for previously scheduled currency transportation services for each of the plurality of retail locations. In certain embodiments, the additional currency transportation requirement data identifies a maximum percentage of currency transported from the plurality of retail locations by a single carrier. In various embodiments, the currency transportation requirement data identifies a maximum percentage of currency transported from the cash handling device to a single final destination. Moreover, the currency transportation requirement data may identify a maximum percentage of currency transported from the cash handling device to final destinations located within a defined geographical area. In certain embodiments, the scheduling data comprises historical data identifying previously completed currency transportation services and pending data identifying uncompleted currency transportation services. In various embodiments, the machine-learning based transportation model is configured to predict future currency transportation service requests and to minimize transportation costs across a plurality of currency transportation services from the cash handling device based at least in part on the predicted future currency transportation service requests and the currency transportation service request.

Certain embodiments are directed to a computer program product comprising a non-transitory computer readable medium having computer program instructions stored therein, the computer program instructions when executed by a processor, cause the processor to: receive a request for currency transportation services associated with a cash handling device, wherein the request for currency transportation services comprises a retail location identifier; retrieve, from one or more memory storage areas, a location-specific retail profile comprising currency transportation requirement data associated with the cash handling device; retrieve, based at least in part on the location-specific retail profile, scheduling data for previously scheduled currency transportation services for the cash handling device; provide one or more of: (a) at least a portion of the request for currency transportation services, (b) at least a portion of the currency transportation requirement data, or (c) at least a portion of the scheduling data, as input to a machine-learning based currency transportation model for automatically initiating a currency transportation service to address the request for currency transportation services; execute the machine-learning based currency transportation model to automatically assign a carrier and a final destination for transporting currency from the cash handling device, wherein the automatically assigned carrier and final destination comply with the at least a portion of the currency transportation requirement data; transmit a notification for provision to a carrier-operated computing entity to initiate the currency transportation service; and update the scheduling data based at least in part on the currency transportation service.

In various embodiments, the computer program instructions when executed by a processor, further cause the processor to: retrieve, based at least in part on the location-specific retail profile, a master retail profile comprising additional currency transportation requirement data; and wherein the automatically assigned carrier and final destination comply with the additional currency transportation requirement data.

In certain embodiments, the additional currency transportation requirement data comprises aggregate currency transportation requirement data establishing currency transportation requirements for currency transportation services provided for a plurality of retail locations; and wherein retrieving scheduling data for previously scheduled currency transportation services for the cash handling device additionally comprises retrieving scheduling data for previously scheduled currency transportation services for each of the plurality of retail locations.

BRIEF DESCRIPTION OF THE SEVERAL VIEWS OF THE DRAWINGS

Reference will now be made to the accompanying drawings, which are not necessarily drawn to scale, and wherein:

FIGS. 6-7 illustrate example output reports according to certain embodiments.

DETAILED DESCRIPTION

Figure 1:
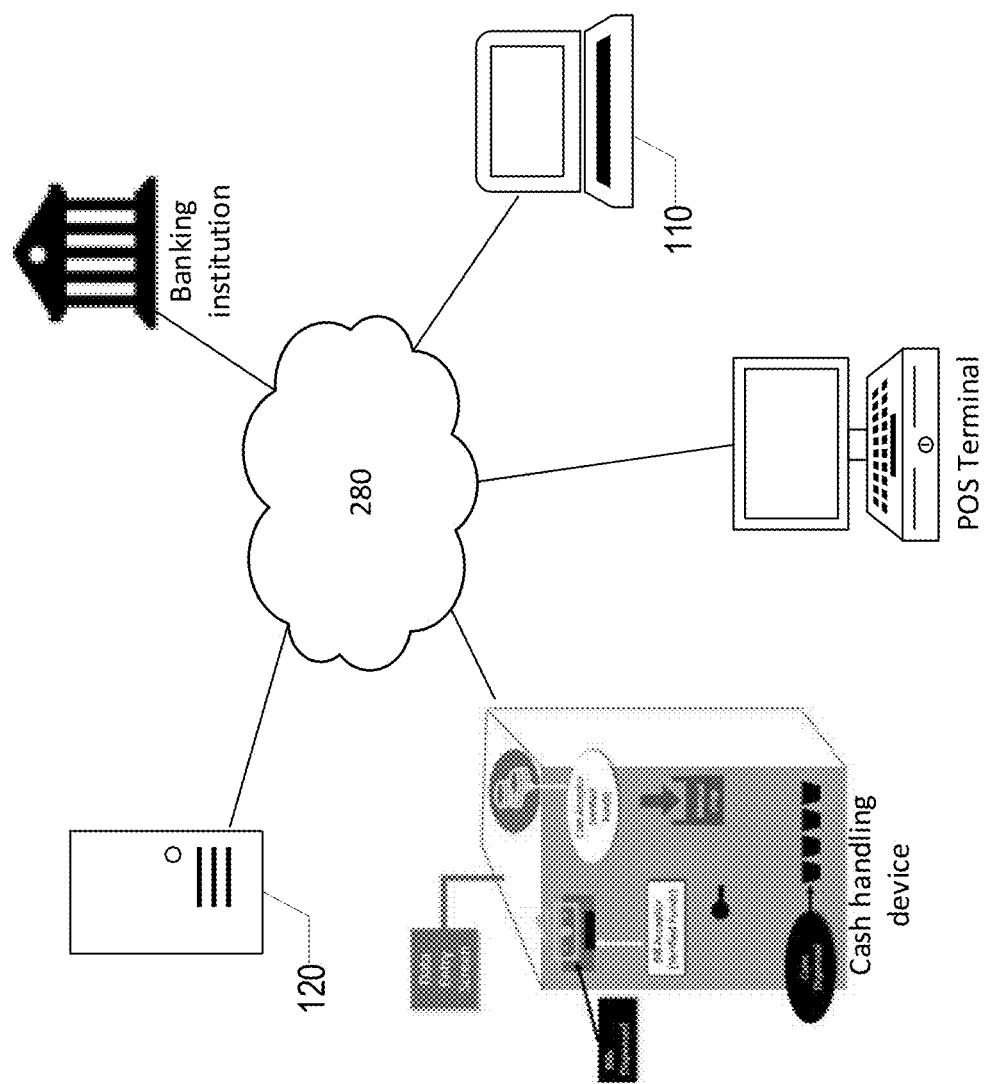
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments are directed to systems and methods for optimizing route generation (including assignment of final delivery destinations at financial institutions for currency transportation services) and carrier assignment to specific retail establishments for completing pick-up and/or drop-off currency transportation services between the retail establishment and a financial institution. For example, various embodiments are configured to automatically select an optimal financial institution location to receive (or provide) cash for/from a particular retail location and for selecting one or more carriers to transport the cash between the retail location and the identified financial institution location. Because a plurality of financial institution locations may be utilized interchangeably as final destinations for currency picked up from a particular cash handling device (e.g., to be credited to a retailer's account with the financial institution), embodiments as discussed herein are configured to automatically select a particular financial institution location (e.g., a bank branch) as a final destination for the currency transportation services so as to optimize the overall currency transportation services for the retailer (e.g., minimize costs for a single currency transportation service; minimize predicted costs over time for currency transportation services; and/or the like).

To optimize the selection of financial institution locations and assignment of carriers to particular retail establishments (e.g., for picking-up and/or dropping-off currency from a cash handling device), various embodiments are embodied as (or comprise) a monitoring server in communication with various financial institutions (e.g., financial institution computing entities), carriers (e.g., carrier-operated computing entities), retailers (e.g., retailer computing entities), and/or the like. The monitoring server may be configured to receive data indicative of locations of various retail establishments (e.g., individual retail locations within a network of retail establishments associated with a single retailer), data indicative of locations of one or more financial institution locations (e.g., bank branches of a particular financial institution, locations of a financial institution cash vault, and/or the like) associated with each retailer (e.g., utilizing a look-up table populated with data retrieved from a retail profile matching individual retail locations with corresponding financial institution locations). Such profiles may be generated at and/or may be representative of the location of various cash handling devices associated with individual retail locations and may additionally comprise data indicative of pick-up and/or drop-off schedules associated with those retail locations. The pick-up and/or drop-off schedules may influence additional relevant data utilized for generating cost estimates, such as data indicating an estimated carrier route for the particular day(s) on which the carrier would visit the retail establishment during currency transportation services. Moreover, the monitoring server may utilize one or more lookup tables (e.g., within location-specific retail profiles) to associate location data with the identified retail locations and financial institution locations, thereby enabling distance-based determinations of relative distances between specific retail locations and their corresponding financial-institution locations. However, it should be understood that selection of a particular financial institution location for exchanging currency with a retail location (e.g., with the cash handling device of the retail location) may be based at least in part on additional considerations, such as risk tolerance factors identified within a location-specific retail profile or a master retail profile associated with the location-specific retail profile. Those risk tolerance factors may identify a maximum amount of cash to be transported by a single carrier, a maximum amount of cash to be transported to a single financial institution location, a comparison of average/maximum transportation costs for transporting currency to a particular financial institution location, and/or the like.

In various embodiments, the monitoring server may be configured to characterize various locations (e.g., within defined geographical boundaries or with specific reference to individual locations) in accordance with a classification system. For example, classifications may be assigned to individual locations from a defined list of available classifications. As a non-limiting example, various locations may be classified as "urban" or "rural." Data indicative of such location classifications may be stored in association with location-based profiles assigned to the retail location and/or the financial institution location. Other characterizations may additionally be reflected and/or classified via the monitoring server, and such data may be reflected within generated reports (e.g., by providing a "scenario" classification as shown in the attached figures). Such additional characterizations may be considered when optimizing financial institution location selection and/or carrier selection according to certain embodiments. For example, such a classification may be utilized when selecting a machine-learning based model applicable to the location (e.g., the monitoring server may be configured to execute one of a plurality of machine-learning based currency transportation models based at least in part on a location classification associated with a retail location requesting currency transportation services).

Moreover, the monitoring server may receive location data associated with various carriers, and/or routing data associated with various carriers so as to determine an estimated route (e.g., including an estimated order) of visiting various locations, including a plurality of retail establishment locations, a plurality of financial institution locations, and/or the like. The location data and/or routing data of various carriers may be provided to and/or stored within carrier profiles accessible to the monitoring server. In certain embodiments, the monitoring server may be configured to characterize various routes or locations associated with carriers (e.g., within defined geographical boundaries or with specific reference to individual locations) in accordance with a classification system. For example, classifications may be assigned to individual routes (or carrier locations) from a defined list of available classifications. As a non-limiting example, various routes (or carrier locations) may be classified as "urban" or "rural." Data indicative of such route (or carrier location) classifications may be stored in association with route-based profiles (or carrier location-based profiles).

Utilizing data indicative of the retail establishment locations, the financial institution locations, the carrier locations, and/or the carrier routes, the monitoring server may be configured to estimate a distance or time during which the carrier would transport currency on behalf of the retailer between the retail establishment location and one or more financial institution locations. The monitoring server may be configured to generate estimated costs associated with transporting currency on behalf of the retailer between each retail establishment and one or more financial institution locations.

The monitoring server may be configured to estimate currency transportation costs based at least in part on estimated distances to be traversed by the carrier while transporting currency on behalf of the retailer, as well as one or more rule-based determinations of estimated costs associated with transporting currency based on additional characteristics of the retail establishment, the financial institution, and/or the carrier. For example, a first cost-estimate rule (and/or machine-learning based model) may be utilized for carrier routes traversing urban areas (e.g., visiting one or more locations classified as urban, traversing a route at least partially characterized as urban, and/or the like). As another example, a second cost-estimate rule (and/or machine-learning based model) may be utilized for carrier routes traversing rural areas (e.g., visiting one or more locations classified as rural, visiting only locations classified as rural, traversing a route at least partially characterized as rural, traversing a route characterized in its entirely as rural, and/or the like).

Accordingly, the monitoring server may be configured to automatically generate currency transportation services (e.g., selection of a carrier and/or a final destination financial institution location) and to generate transportation estimate data indicative of costs associated with transporting currency on behalf of a retailer between a retail location and one or more financial institution locations, for a plurality of carriers. Such data may comprise estimated cost data (e.g., provided as a currency estimate), relative cost estimates (e.g., a determination of which carrier is likely to provide the lowest transportation costs and/or referencing which financial institution is likely associated with the lowest transportation costs, without referencing a currency-based estimate), and/or the like.

Figure 6:
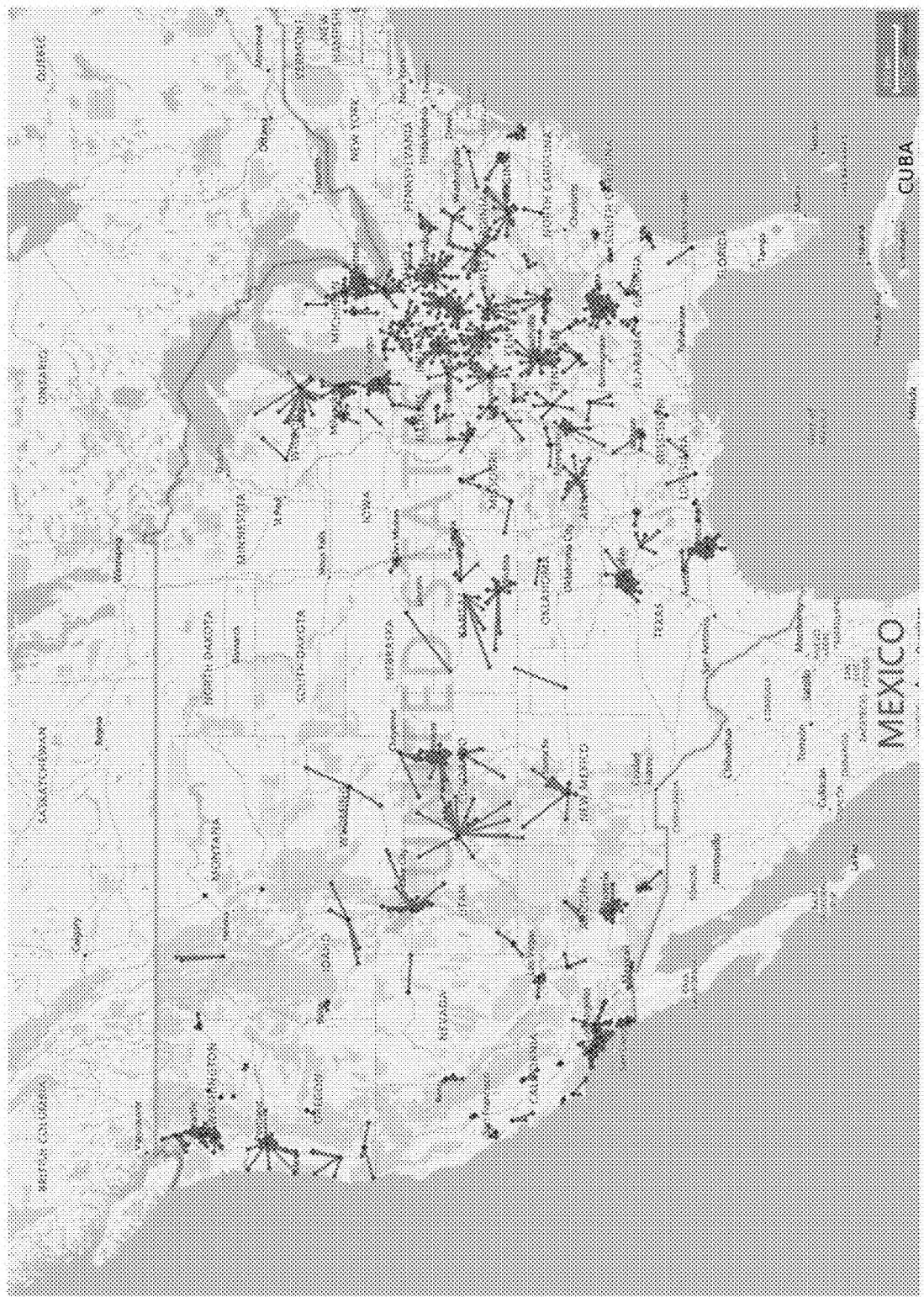

The monitoring server may be configured to generate one or more reports representing the results of the cost estimates generated for transporting currency on behalf of a retailer. FIGS. 6-7 illustrate two example reports that may be generated on behalf of a retailer. These reports may be generated on a per-location basis. For those retailers with a plurality of locations, a plurality of location-specific reports may be generated. The monitoring server may additionally be configured to generate one or more aggregated reports, so as to provide aggregate estimate data at one or more levels of granularity. These aggregated reports may reflect aggregate data (e.g., aggregate scheduling data indictive of previously scheduled currency transportation services on behalf of a retailer) to ensure that any aggregate rules (e.g., risk tolerance-based rules) for a retailer are satisfied (e.g., no single carrier is responsible for greater than a maximum percentage of cash for a particular retailer, across all retail locations). In certain embodiments, the monitoring server may operate in association with an interactive user interface configured to receive user input specifying a particular level of granularity to filter and/or aggregate estimate data. As just one example, the monitoring server may be configured to aggregate cost data based on location (e.g., so as to generate cost estimate data for locations falling within a defined geographical area, such as a specific city, a specific state, a specific zip-code, and/or the like). As another example, the monitoring server may be configured to aggregate cost data based on financial institution (e.g., so as to generate cost estimate data for transporting currency to or from a specific type of financial institution). It should be understood that the monitoring server may be configured to generate aggregated estimate data for transportation estimates having other characteristics.

These aggregated estimates may be generated so as to provide an estimated average transportation cost (e.g., to indicate which carrier, on average, provides a lower cost of transporting currency within the aggregated data). In other embodiments, the aggregated estimates may be generated so as to provide an overall estimated cost (e.g., to indicate which carrier provides a lower overall cost of transporting currency within the aggregated data). It should be understood that other aggregated data may be provided in accordance with certain embodiments.

Moreover, as indicated herein, various reports may be provided by the monitoring server via one or more user interfaces, such as via graphical user interfaces displaying interactive user interfaces accessible to various users via corresponding computing entities. It should be understood that reports may be generated and provided to users via other electronic communication mechanisms, such as transmitting reports via email, via computer-based messaging, and/or the like.

In certain embodiments, the monitoring server may be configured to automatically assign specific carriers to specific retail locations to provide currency transportation services for the retailer location via a machine-learning based model, based at least in part on a determination (or estimation) of a lowest cost carrier for providing currency transportation services to the retailer location. Other optimization criteria may be utilized in certain embodiments, such as minimizing a lowest estimated cost of currency transportation services over a period of time encompassing a plurality of currency transportation services. The monitoring server may automatically generate and transmit cash pick-up and/or drop-off instructions to an assigned carrier based at least in part on the determined carrier assignment, as needed for providing currency transportation services. The monitoring server may be configured to periodically update assigned carriers for specific retail establishments, for example, as various data stored within one or more profiles associated with the carrier, financial institution, and/or retailer location is updated, and/or based on outputs of a machine-learning based currency transportation model such that the monitoring server continuously selects a lowest-cost carrier for servicing a particular retailer location.

It should be understood that other criteria may be utilized for assigning a carrier and/or a final destination financial institution location to a particular retailer location beyond simply selecting a lowest cost carrier. For example, the retailer may blacklist or whitelist one or more carriers (or financial institution locations), such that the assigned carrier must be from the identified whitelisted carriers (or must not be from the identified blacklisted carriers). Other criteria may additionally be utilized, such as selecting a carrier and/or a final destination financial institution location satisfying one or more additional currency transportation requirements. These other currency transportation requirements may be utilized instead of or in combination with cost-based selection criteria. For example, the monitoring server may be configured to identify and/or assign a carrier and/or a financial institution location to satisfy a request for currency transportation services that satisfies one or more currency transportation requirements (e.g., specific to a particular retail location and/or specific to a plurality of retail locations of a single retailer) while also minimizing costs. Accordingly, the monitoring server may be utilized for generating a network of carriers to service retail establishment locations associated with a single multi-location retailer. The monitoring server may be configured to dynamically update the network of carriers for the retailer to optimize the selection of carriers for individual retail establishment locations.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIGS. 1A-1B provide an illustration of an exemplary embodiment of the present invention. As shown in FIGS. 1A-1B, this particular embodiment may include one or more monitoring servers 120, one or more mobile devices 110, one or more cash handling devices as discussed herein, one or more self-check out (SCO) point-of-sale (POS) devices, one or more networks 280 enabling communication among computing devices and a banking institution (e.g., a banking institution server system), and/or the like. In various embodiments, certain of these devices (e.g., the SCO POS terminal and/or other POS terminals within a retailer may be in communication with the monitoring server 120 via a back office service hosted locally at the retail establishment. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
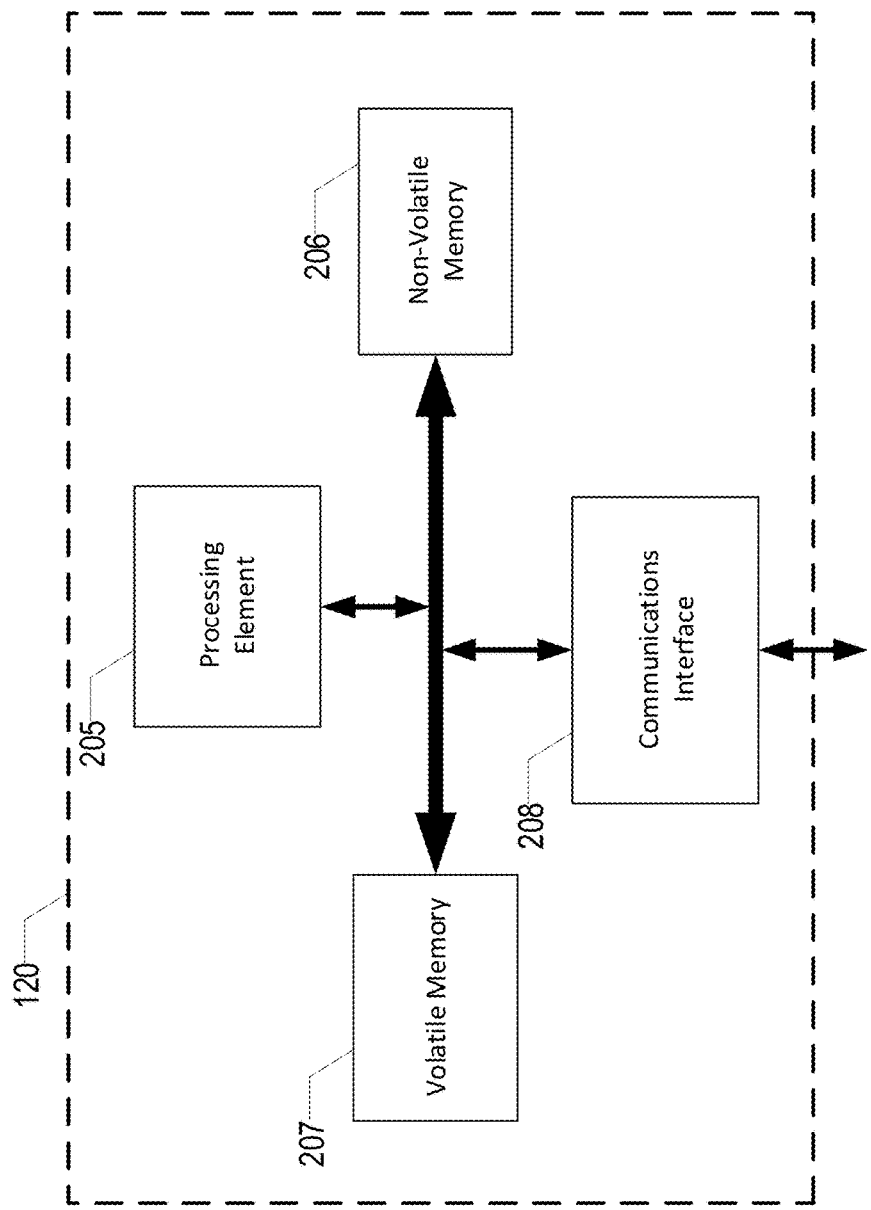
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more mobile devices 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device, a particular POS terminal, and/or the like. For example, the cash handling device and/or POS terminal may provide data indicative of aggregate inputs and outputs of cash to the machine, while a user computing device may provide data indicative of how the aggregate inputs and outputs are divided among a plurality of retail tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device and/or POS terminal, as well as manually generated data provided from a user computing entity indicative of how the cash was distributed from/to a various tills.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 110 to obtain information/data regarding one or more accounts to which the user has access. As will be recognized, an account associated with a cash handling device may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
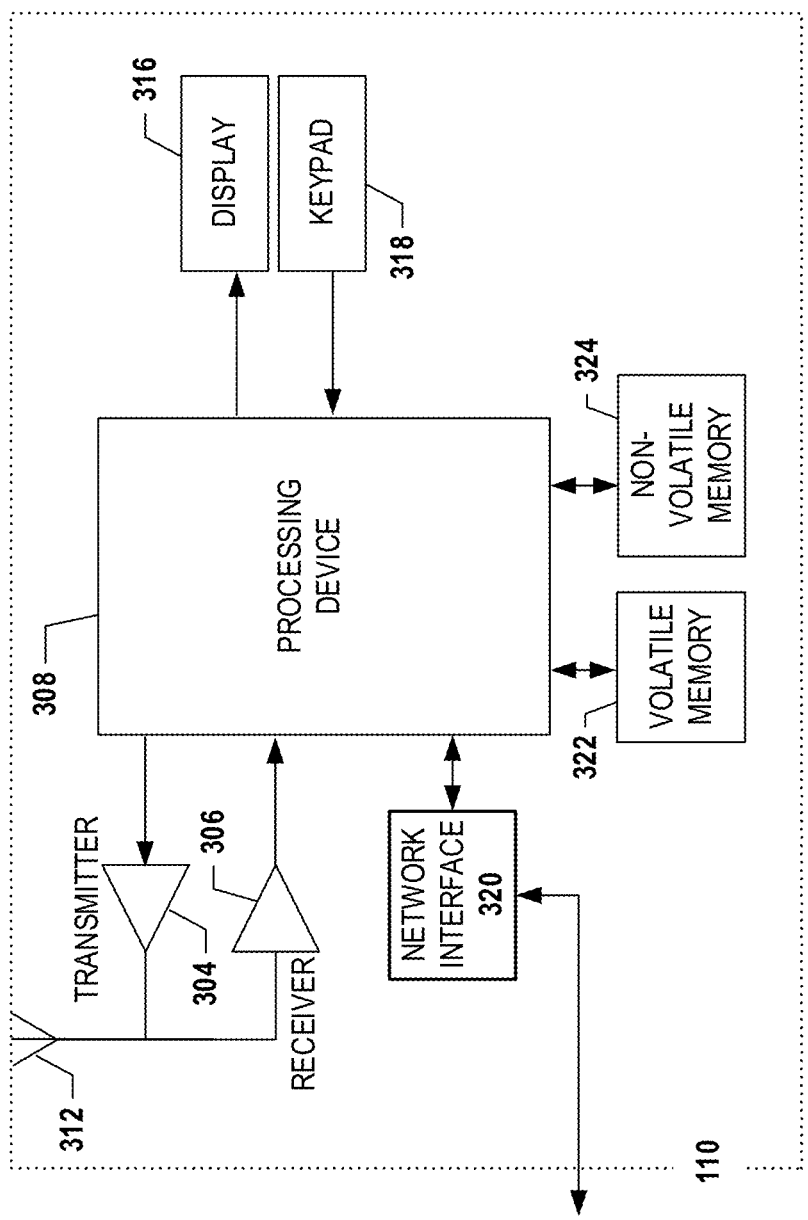
FIG. 3 schematically illustrates features of a handheld device according to certain embodiments.

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device to enable the user to gain account access via the cash handling device. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
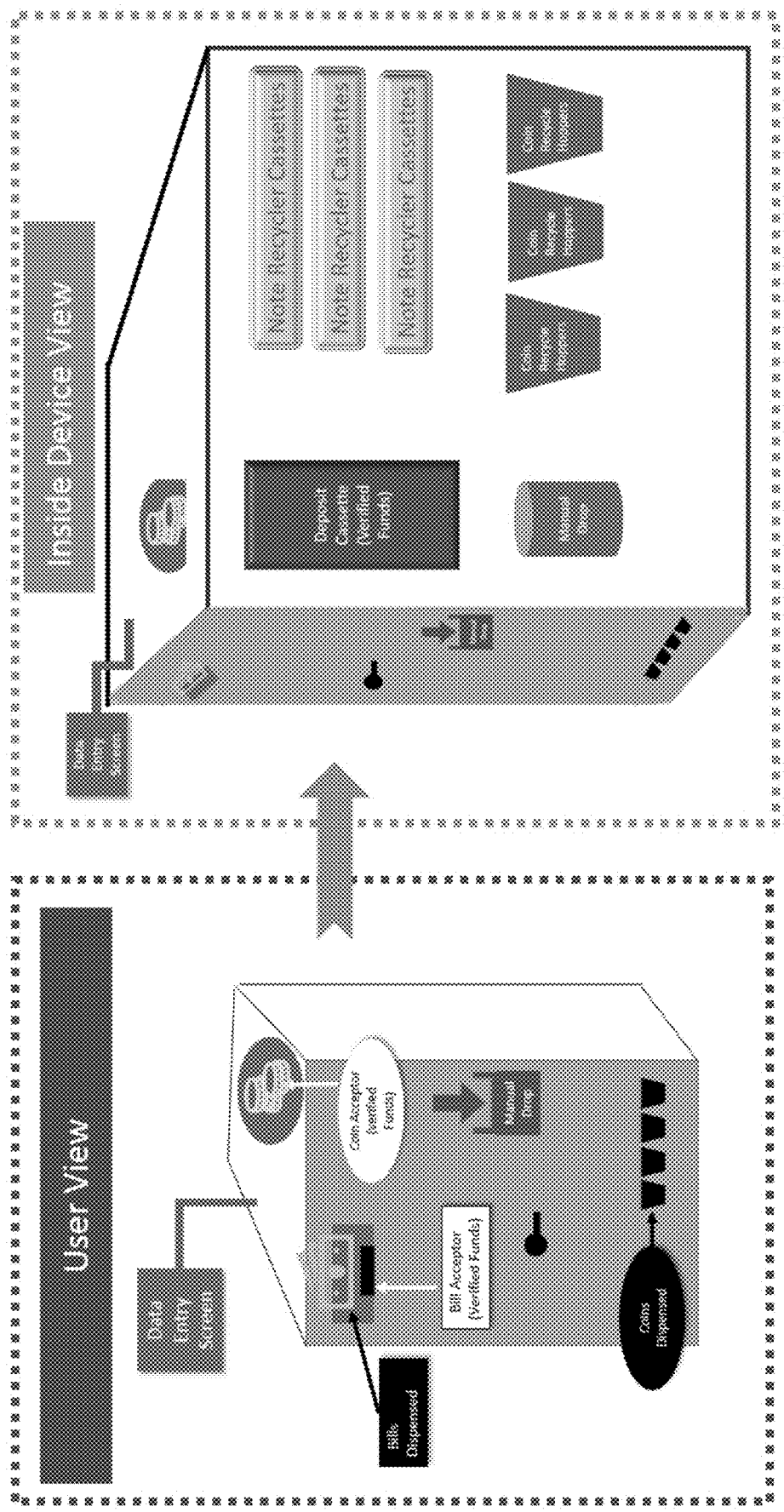
FIG. 4 schematically illustrates features of a cash handling device according to certain embodiments.

An example cash handling device is shown schematically at FIG. 4. As shown therein, components of the cash handling device are disposed within and/or on a housing. The cash handling device may comprise a user interface (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device hardware may comprise one or more secure information storage areas configured to securely store user data (e.g., user identifiers, user passwords/passcodes, user biometric data, and/or the like) to prevent unauthorized access to such user data. These secure information storage areas may be accessible to certain authorized users, thereby enabling those authorized users to add or remove user data, for example, as new employees/users become authorized to interact with the cash handling device and/or as prior employees/users are no longer authorized to interact with the cash handling device.

The cash handling device may further comprise one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like. As discussed herein, the cash handling device may additionally comprise a retail till receiving portion configured to receive a retail till during receipt and/or distribution of cash stored within the retail till. In certain embodiments, the retail till receiving portion may further comprise a retail till identifier scanner configured to obtain retail till identifier data for tills located therein, such that data indicative of cash added to and/or removed from the retail till may be associated with the retail till identifier.

The cash handling device components collectively enable a user (e.g., a representative of a particular commercial establishment customer having an account accessible via the cash handling device) to deposit and/or withdraw funds from the cash handling device (which may result in corresponding changes to an account balance in an account held at a particular banking institution for the commercial establishment), for example, when emptying or filling a retail till. In certain embodiments, the cash handling device may enable users to withdraw currency in requested quantities and denominations (e.g., requested quantities of each of a plurality of denominations). Users may interact with the cash handling device via the one or more user interface mechanisms to (1) provide user identifying data (e.g., via the one or more data readers, the PIN pad, a touch screen, and/or the like), and (2) to provide data indicative of a requested transaction to be performed with the cash handling device.

In certain embodiments, a plurality of users may be associated with a single account with the cash handling device, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device, on a memory within a physical identification token (e.g., a card) carried by the user, and/or the like.

With reference to FIG. 4, which illustrates a schematic view of various components of a cash handling device according to one embodiment, the cash handling device may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. As discussed herein, the trigger event utilized to redirect notes from a recycler cassette to a deposit cassette may be dynamic, and may be adjusted based at least on part on cash usage models established and/or maintained at the monitoring server. For example, on a first day, a first threshold quantity of notes may be utilized as a trigger event for redirecting funds to a deposit cassette, and on a second day, a second threshold quantity of notes, different from the first threshold quantity of notes, may be utilized as a trigger event for redirecting funds to a deposit cassette. Thus, the model maintained at the monitoring server may adjust the amount of cash available for circulation within a retail environment based at least in part on factors considered in maintaining the applicable model.

Moreover, as discussed herein, movement of notes to a deposit cassette may itself be a trigger event for various tasks to be performed by the cash handling device or a networked monitoring system, such as transmitting data to a banking institution to direct funds into a particular account at the banking institution.

In certain embodiments, each time notes are moved within the cash handling device, the notes may pass through a quantity and/or denomination verification system to automatically monitor the amount of currency moving between the various portions of the cash handling device, thereby enabling the cash handling device to maintain an accurate count of the amount of currency in each denomination contained therein.

With reference now to the coin circulation system, the cash handling device may comprise a coin acceptor configured to accept coins deposited by a user of the cash handling device (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device may comprise a plurality of denomination specific coin hoppers for storage of deposited coins. For example, a cash handling device may comprise two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device may be configured for automatically providing cash into a cashier tray (also referred to herein as a retail till) (e.g., a tray to be utilized with a cash register at a POS terminal). In such embodiments, the cashier tray may be supported within the cash handling device, and the cash handling device may selectably deposit quantities of notes and coins of select denominations into segmented portions of the cashier tray.

Moreover, the cash handling device comprises a receipt printer configured for printing physical receipts that may be usable by individual users and/or during change order processing as discussed herein.

The cash handling device may be configured such that at least a portion of the cash contained therein is bank-owned. This bank owned cash is not associated with any one or more customers' account(s), thereby enabling credits to be given to a user's account upon receiving a physical cash deposit at the cash handling device. Similarly, credit is not deducted from the user's account until and unless the user withdraws physical cash from the bank owned cash portion of the cash handling device.

In certain embodiments, the cash handling device is configured such that only a portion of the total cash contained within the cash handling device is bank-owned, and accordingly the cash handling device defines a plurality of cash storage locations therein, including at least one storage location for bank owned cash and another storage location for customer (depositor) owned cash. As just one example, bank owned cash may be stored within a deposit cassette (which may not define an outlet for cash), while cash within a note recycler and/or a coin recycler (having both deposit and withdrawal configurations) may remain depositor owned. In certain embodiments, the cash handling device comprises a verification mechanism for counting the quantity and value of notes being transferred into the deposit cassette or other storage location associated with bank-owned-cash. Accordingly, the cash handling device is configured to utilize only verified funds that have been specifically counted and valued via the verification mechanism for bank-owned-cash.

In certain embodiments, the cash handling device may be configured to enable deposits and withdrawals from bank owned cash portions by various users. Accordingly, the bank owned cash portion of the cash handling device may encompass at least a note recycler (and/or a coin recycler) and may additionally comprise a deposit cassette in certain embodiments.

Cash Handling Device Controller

A cash handling device having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 110 discussed above, and which may be configured to support processing in connection with deposit and withdrawal transactions for funds via the cash handling device. The one or more cash handling device controllers may include computing device(s) that are local to a corresponding cash handling device and/or computing device(s) that are remotely located. At least one of the cash handling device controllers may be configured to access and store information/data in at least one of one or more datastores to perform processing supported by the cash handling device.

As just one example, the cash handling device controller may be configured to monitor the amount of each of a plurality of denominations of cash that are dispensed and/or collected during a deposit or withdrawal transaction. When dispensing cash into a retail till, the cash handling device controller may store a till identifier for which dispensing is performed, and may store data indicative of the amount of cash (and the denominations of those distributions) dispensed into the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing. Similarly, when receiving cash deposited from a retail till, the cash handling device controller may store a till identifier for which dispensing is performed, and may store data indicative of the amount of cash (and the denominations of those deposits) deposited from the retail till. Additional metadata associated with the transaction may also be stored, such as the date and/or time of dispensing, a user identifier associated with the transaction, and/or the like. The cash handling device controller may provide the stored data of the transaction to the monitoring server (e.g., by transmitting the transaction-specific data via a network) for further processing.

Exemplary POS Terminal

A POS terminal may be configured for receiving and/or dispensing cash during one or more transactions. A POS terminal may be embodied as a self-checkout (SCO) terminal, specifically configured for operation with/by a retail customer. Particularly for POS terminals configured for use in SCO implementations, the POS terminal limits user access to cash stored therein, by accepting cash via a cash acceptor mechanism (e.g., an acceptor slot) and dispensing cash via a cash dispensing mechanism (e.g., a dispensing slot).

In other embodiments, a POS terminal may be specifically configured for operation with/by a retail employee helping individual retail customers during transactions. The POS terminal may comprise one or more user interfaces (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the cash handling device hardware may comprise one or more secure information storage areas configured to securely store data, such as transaction data, cash content data, and/or the like.

The POS terminal may further comprise one or more currency outputs (e.g., a coin dispenser, such as a loose coin dispenser, a note dispenser, such as loose note dispenser, and/or the like), one or more currency intakes (e.g., a coin acceptor, a check/note scanner/acceptor, and/or the like), a receipt printer, and/or the like. The POS terminal may additionally comprise one or more cash recycler portions configured to store cash, separated by denomination, therein. The cash recycler portions may be configured to accept cash provided to the POS terminal and/or to dispense cash from the POS terminal, for example, as change to a customer during a transaction. As discussed herein, the cash recycler portion may be configured as a Last-In-First-Out configuration for each denomination, such that the most recently received bill for a particular denomination is the first bill to be dispensed during the same or a later transaction.

The POS terminal may comprise a note circulation system encompassing a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recyclers may be counted, imaged, and/or otherwise verified to monitor the quantity of notes provided/withdrawn from the POS terminal, as well as the denomination of those notes.

As is particularly relevant for deposits, the note acceptor may be configured to segregate notes by denomination prior to providing those notes to a note recycler. The segregated notes may be stored in separate storage locations (e.g., separated portions of a recycler) such that the notes may be easily recycled based on denomination for later transactions if needed.

Moreover, the POS terminal may comprise a POS terminal controller configured for causing the POS terminal cash recycler to deposit and/or accept cash in applicable amounts for a particular transaction. In certain embodiments, the POS terminal controller may have a configuration similar to the cash handling device controller, such that the POS terminal controller comprises one or more non-transitory memory storage areas, one or more processors, one or more network connection mechanisms, and/or the like. Accordingly, the POS terminal controller may be in electronic communication (e.g., via a network) with the cash handling device controller, the monitoring server, and/or the like. Such network connections thereby enable the monitoring server to provide data directly to a POS terminal (and vice versa), for example, so as to update data representative of an amount of BOC contained within the POS terminal, and/or to update data enabling the POS terminal to distribute BOC during transactions.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous—processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous—processes are decoupled and mechanisms include message queues and file transfers.

Retail Profiles

Retail profiles are stored in a memory storage area accessible to the monitoring server to store data indicative of characteristics of retail locations (and corresponding cash handling device locations) for which currency transportation services are provided. For retailers having multiple locations, the retail profiles may be stored in a hierarchical relationship to other retail profiles, with each individual retail location having a corresponding profile that is linked with a master retail profile storing characteristics that are applicable to all retail locations for that retailer. For example, a national retailer chain may have a master retail profile storing particular characteristics therein, and each individual location of that retailer may have its own corresponding profile that reflects any characteristics of the master retail profile as well as location-specific characteristics. The master retail profile may reflect a preference for a particular carrier and the location-specific profile may further identify the exact location of a cash handling device. Moreover, in certain embodiments the master retail profile may be utilized for storing data indicative of currency transportation services provided for a plurality (e.g., all) of locations for a particular multi-location retailer, in the aggregate.

Location-specific retail profiles comprise a unique location identifier to distinguish each location-specific retail profile from one another. For those location-specific retail profiles that are associated with a master retail profile, the unique location identifier may be linked with a unique master retailer identifier (e.g., the unique master retailer identifier may form a part of the unique location identifier). In other embodiments, the unique master retailer identifier may be stored in a separate data field within the location-specific retail profile. The master retail profile may be linked with location-specific retail profiles using any of a variety of data links.

The location-specific retail profiles additionally store data specific to a particular retailer location. the location-specific retail profiles store location data of the specific retailer location (e.g., a street address). Additional location data, such as the location of a cash handling device at the specific retailer location, may additionally be stored in the location-specific retail profile (e.g., indicating the room in which the cash handling device is located for the specific retail profile). In certain embodiments, contact information (e.g., a phone number, email address, location manager name, and/or the like) may additionally be stored in the location-specific retail profiles. Location-specific retail profiles may additionally comprise data generated at least in part by the cash handling device, such as data indicative of a quantity of cash stored within the cash handling device (such data being provided on a cash denomination-specific level in certain embodiments, such as to distinguish between the quantity of $20 bills within the cash handling device, the quantity of $10 bills within the cash handling device, and/or the like). In other embodiments, the location-specific retail profile may be linked with data stored within a separate system, such as a system providing cash handling device operational management and/or cash handling device inventory tracking.

Moreover, the location-specific retail profiles may each store historical data indicative of historical currency transportation services provided for the retail location (including data indicating the type of currency transportation service provided (e.g., pick-up or drop-off), the date/time of the currency transportation service provided, the amount of cash (on a denomination-level) involved in the currency transportation service, the financial institution location identified as a destination (or origin) for the currency transportation services), the carrier utilized for the currency transportation services, a cost of the currency transportation services (if applicable), and/or the like. FIG. 7 provides an example output report that may be generated and/or displayed to a user requesting certain data stored within a location-specific retail profile. As shown therein, the location-specific retail profile may comprise location data (e.g., a city, state, zip code, and/or the like) of a particular retailer location. The location-specific retail profile may additionally comprise data indicative of a financial institution to be utilized for currency transportation services. The identification of a financial institution may identify a financial institution with a plurality of financial institution locations, and the data identifying the financial institution may additionally identify a city or other geographical region within which the specific financial institution locations selected for currency transportation services are located. The location-specific retail profile may additionally comprise scheduling data (illustrated in summary form in the report of FIG. 7) indicative of previously scheduled currency transportation services. The scheduling data may reflect historical data (of completed transportation services) and pending data (of uncompleted transportation services that are scheduled to be completed in the future). As reflected in the report of FIG. 7, a summary of the scheduling data may be embodied as a count of currency transportation services provided by each of one or more carriers. It should be understood that additional detail, such as specific detailed data of each individual currency transportation service provided (e.g., date/time of service, type of currency transportation service (e.g., pick-up or drop-off), financial institution location utilized, amount of cash (at a denomination level), and/or the like). As additionally reflected within the example report of FIG. 7, the location-specific retail profiles may encompass "scenario" data (referred to alternatively as location classification data) indicative of a classification of the specific retailer location. The classification of the specific retailer location may be utilized to select a particular machine-learning based model (or set of rules) for identifying and/or assigning currency transportation services. The classification may be automatically generated via a machine-learning classification engine that assigns retailer location specific classifications based at least in part on previously assigned classifications of other retailer locations. As examples, the classifications may distinguish between "urban" and "rural" retailer locations, which may have different cost considerations when assigning currency transportation services.

As mentioned, the location-specific retail profiles store data of scheduled currency transportation services, including data identifying the scheduled date/time of the currency transportation services, the type of currency transportation services scheduled (e.g., pick-up or drop-off), the estimated amount of cash (on a denominational level) to be picked-up or dropped-off during the currency transportation services, the carrier scheduled to complete the currency transportation services, the financial institution location identified as a destination/origin of the currency transportation services, and/or the like.

The location-specific retail profiles may additionally comprise currency transportation requirement data indicative of various preferences/requirements for currency transportation services to be provided for the specific location. The currency transportation requirement data comprises an identification of one or more financial institutions that are acceptable final destinations for currency transported from the specific retail location. The one or more financial institutions may be identified as specific financial institution locations (e.g., identified by street address), or the one or more financial institutions may be identified more broadly, such that any location associated with the one or more financial institutions is identified as an acceptable final destination for currency transported from the specific retailer location. The identification of a financial institution acceptable to receive currency transported from the specific retailer location may be a location-specific identification of acceptable financial institutions (e.g., cash from a retailer at 123 Main St. Anytown, USA may only be delivered to Bank A at 234 Broad St. Anytown USA), or the identification of a financial institution acceptable to receive currency transported from the specific retailer location may be generated based at least in part on data stored within a master retail profile (e.g., all locations of a retailer chain may utilize any location of a particular financial institution as a final destination for currency picked-up from a particular retailer location).

The currency transportation requirement data additionally identifies one or more acceptable carriers for providing currency transportation services for the specific retail location.

In certain embodiments, the currency transportation requirement data specifies one or more acceptable days for receiving currency transportation services for the specific retail location. The acceptable days may be identified by acceptable dates (e.g., May 5, 2021), by acceptable days of the week (e.g., Tuesdays and Thursdays), acceptable weeks of the month (e.g., the second week of the month), and/or the like. As discussed in greater detail herein, currency transportation models may identify suggested changes to acceptable days to optimize currency transportation services in certain embodiments.

Similarly, the currency transportation requirement data may specify one or more acceptable times for receiving currency transportation services for a specific retail location. The acceptable times may be identified as acceptable time windows (e.g., any acceptable day between 8 AM-11 AM) and/or as combinations of acceptable days and times (e.g., on Tuesdays between 4 PM-7 PM or on Thursdays between 8 AM-10 AM). As discussed in greater detail herein, currency transportation models may identify suggested changes to the acceptable times to optimize currency transportation services in certain embodiments.

In certain embodiments, the currency transportation requirement data is provided as one or more conditional rules dictating acceptable final destinations for transportation of cash from the particular retailer location and/or dictating acceptable carriers for providing transportation services for the particular retailer location. In certain embodiments, the conditional rules are provided at least in part to ensure a high level of diversity in service providers (e.g., carriers and/or specific financial institution locations) utilized for providing currency transportation services so as to mitigate risks of disruptions in currency transportation services that could otherwise result from a particular service provider being incapable of providing currency transportation services. The conditional rules may thus only become limitations on selection of service providers when certain diversity-based criteria are not satisfied (e.g., more than a maximum percentage of cash is being transported by a particular carrier). It should be understood that the one or more conditional rules may additionally be provided to ensure minimal interruptions to the normal operations of the retailer, such as by ensuring that cash transportation services are only provided on acceptable days and/or at acceptable times. The conditional rules may be based at least in part on historical currency transportation services provided to the particular retailer location. In other embodiments, the conditional rules may be based at least in part on historical currency transportation services provided to all retail locations associated with a particular master retail profile.

As an example of a conditional rule dictating acceptable final destinations for cash picked-up from a particular retailer location, the location-specific retail profile may comprise data defining a maximum percentage of all currency transported from a particular location during a defined time period (e.g., one week, two weeks, one month, and/or the like) that can be delivered to a single financial institution location or to any financial institution locations within a defined geographical area (e.g., a geographical area bounded by a geofence; a geographical area defined according to other characteristics, such as within a defined city limits, within a particular zip code, and/or the like). A conditional rule defining a maximum percentage of cash that may be transported to a single financial institution location enacts a level of diversification among destinations that may be utilized for cash delivered from a particular retail location. The multiple financial institution locations that are utilized as destinations for cash from a particular retail location are thus prepared for receiving and processing deposits from the particular retail location. If one of the plurality of acceptable financial institution locations is inaccessible for a particular delivery (e.g., due to a natural disaster), other financial institution locations are prepared to provide cash deposit services for the retail location. To implement such a conditional rule relating to maximum percentages of cash that may be delivered to a particular financial institution location, the monitoring server accesses the scheduling data for previously scheduled currency transportation services, including historical data of historical currency transportation services provided for the particular retail location and/or pending transportation services that have been scheduled but not yet completed to determine whether scheduled currency transportation services limit the available financial institution locations that may be utilized as a destination/origin of currency transportation services while remaining in compliance with the conditional rule(s) dictating financial institution locations that may be utilized as a destination/origin for currency transportation services.

As an example of a conditional rule dictating carriers that may be utilized for currency transportation services relating to a particular retail location, the location-specific retail profile may comprise data defining a maximum percentage of all currency transported from a particular location during a defined time period (e.g., one week, two weeks, one month, all time, and/or the like) that may be transported by a particular carrier. In other embodiments, the location-specific retail profile may comprise data defining a maximum percentage of all currency transported from any location of a multi-location retailer that may be transported by a particular carrier. A conditional rule based at least in part on currency transportation services provided for a plurality of retail locations may be applied to a particular location-specific retail profile from a master retail profile. By defining a maximum percentage of cash that may be transported by any single carrier, the retailer ensures that transportation services will remain available even if a single carrier is incapable of providing transportation services (e.g., due to a natural disaster, due to the carrier going out of business, and/or the like). To implement such a conditional rule relating to a maximum percentage of cash that may be transported by a single carrier (either for a single location or for multiple locations), the monitoring server accesses the scheduling data for a particular retail location, including historical data of historical currency transportation services provided for the particular retailer (e.g., the particular retail location or all retail locations linked with a master retail profile) and/or pending currency transportation services to determine whether the scheduling data limits the available carriers that may be utilized to provide currency transportation services while remaining in compliance with the conditional rule(s) dictating carriers that may be utilized for currency transportation services.

It should be understood that other conditional rules may be defined within the location-specific retail profiles.

Master retail profiles are stored in a memory storage area accessible to the monitoring server. The master retail profiles are provided to apply a common set of characteristics, currency transportation requirements, and/or the like to a plurality of retail locations of a single retailer. Moreover, the master retail profiles may additionally be utilized to track aggregate data regarding currency transportation services provided to a plurality (e.g., all) of the retail locations associated with the master retail profile. This aggregated data may be utilized for generating one or more reports (e.g., table-based reports such as that shown in FIG. 7 of data relating to a plurality of retail locations associated with the master retail profile; or graphical reports such as that shown in FIG. 6 geographically illustrating scheduling data for a plurality of retail locations). For example, data indicative of the amount of currency transported by each of a plurality of carriers on behalf of the retailer for a plurality of retail locations may be stored in association with the master retail profile. The aggregated data regarding the provided (and/or scheduled) currency transportation services may be compared against applicable currency transportation requirement data relating to the aggregate currency transportation services (e.g., total amount of currency to be transported by a particular carrier on behalf of a retailer across all retailer locations compared against a maximum percentage of currency to be transported by a single carrier).

In certain embodiments, master currency transportation requirement data may have classification limitations associated therewith. The classification limitations ensure that the corresponding currency transportation requirement data is only applicable to retail locations having a defined classification. For example, a master currency transportation requirement may be defined to be applicable only to "rural" retail locations, while a different master currency transportation requirement may be defined to be applicable only to "urban" retail locations.

The master retail profiles comprise a unique master retail identifier enabling distinction between master retail profiles. In certain embodiments, all location-specific retail profiles are associated with a master retail profile (with those location-specific retail profiles associated with single-location retailers having data that is identical to data stored in a corresponding master retail profile). The master retail profiles comprise identifying data, such as a name of a retailer associated with the master retail profile. The master retail profiles additionally comprise location-specific identifiers (e.g., the unique location-specific retail identifiers stored in each location-specific retail profile as discussed above), and/or the master retail profiles may be linked with corresponding location-specific retail profiles, such that data within the master retail profile may be associated with the linked location-specific retail profiles.

In certain embodiments, the master retail profiles comprise currency transportation requirement data identifying currency transportation requirements that are applicable to all retail locations associated with the master retail profile and/or currency transportation requirements having associated classifications that are applicable to retail locations having the same associated classifications. The currency transportation requirements of the master retail profile may be applicable based on data generated at a single retail location only (e.g., maximum amount of cash that may be transported to a particular financial institution location from a single retail location) and/or the currency transportation requirements of the master retail profile may be applicable based on data generated in the aggregate from a plurality of retail locations (e.g., maximum amount of cash that may be transported by a single carrier, for all retail locations).

Carrier Profiles

Carrier profiles may be stored in a memory storage area accessible to the monitoring server. The carrier profiles each have a unique carrier identifier that may be utilized to distinguish between carriers. The carrier profiles each additionally store characteristic data identifying one or more characteristics of an associated carrier. For example, the characteristic data may comprise a carrier name, one or more carrier operating locations within which the carrier provides currency transportation services (e.g., geographical areas having boundaries defined by geofences or by other geographical features, such as city limits, zip codes, and/or the like), contact information for a carrier (e.g., a contact person's name, an email address, a phone number, and/or the like). The carrier profiles may additionally comprise route data identifying carrier routes along which one or more carrier vehicles are scheduled to travel to provide currency transportation services. The route data may identify one or more stops to be completed along a route. In other embodiments, the route data may only identify one or more financial institution locations to be visited by a carrier along the route (thereby maintaining some secrecy for the carrier such that individuals that are not employed by the carrier cannot identify the exact route along which a particular carrier is to travel. In other embodiments, the carrier profiles may not comprise route data, but may comprise an external link, an Application Program Interface (API) address, and/or the like that accesses an external computing entity of the carrier that stores routing data of the carrier. The carrier profiles may additionally comprise pricing data that may be utilized to estimate costs of currency transportation services. However, it should be understood that carrier profiles may not comprise pricing data, and such data may alternatively be stored in location-specific retail profiles reflecting pricing agreements between carriers and specific retailers. Regardless of where the pricing data is stored, the pricing data may comprise formulas, rules, or other conditional data defining pricing strategies for providing currency transportation services.

Model Generation

The monitoring server is configured to automatically identify and/or assign a carrier to complete currency transportation services for a retail location when currency transportation services are requested (e.g., upon receipt of currency transportation service request data). The monitoring server additionally or alternatively identifies and assigns a destination for the currency transportation services for a retail location when currency transportation services are requested to transport currency from the retail location to a financial institution. Similarly, the monitoring server is configured to identify and assign an origin for currency transportation services for a retail location when currency transportation serves are requested to transport currency from a financial institution to the retail location. As a part of identifying and assigning a carrier to complete the currency transportation services and a final destination financial institution location to receive the currency as a part of the currency transportation services, execution of the model additionally identifies a day and time for completion of the currency transportation services. In certain embodiments, identifying a day and time for completion of the currency transportation services comprises identifying a recommended day and/or a recommended time for completion of the currency transportation services that does not comply with a currency transportation requirement within a retail profile. These recommendations may be provided as recommended changes to the day and/or time requirements within the currency transportation requirements of the retail profile based at least in part on a determination (e.g., via execution of the model) that lower cost currency transportation services may be provided if the recommended changes to the day and/or time requirements within the currency transportation requirements are adopted.

The monitoring server is configured to automatically identify and/or assign a carrier, an origin, and/or a destination for currency transportation services while maintaining compliance with currency transportation requirements (e.g., conditional currency transportation requirements) as identified within location-specific retail profiles, within master retail profiles, and/or the like. Utilizing machine-learning based models and/or rule-based models, the monitoring server is configured to receive a request for currency transportation services (the request may be generated automatically or manually for a particular cash handling device at a particular retail location and is embodied as currency transportation service request data that encompasses a plurality of structured data), and to automatically identify and/or assign a carrier and a destination for the requested currency transportation service while maintaining compliance with any/all applicable currency transportation requirements of the location-specific retail profile and/or the master retail profile, while also optimally minimizing transportation costs for a single currency transportation service, maximizing flexibility in assigning later-requested currency transportation services, minimizing transportation costs for currency transportation services in the aggregate, maximizing diversity in carrier usage and/or financial institution location usage, and/or the like.

In certain embodiments, the monitoring server executes a machine-learning based model to identify and/or assign a carrier and/or a destination for currency transportation services. The machine-learning based model is trained on a training data set encompassing historical data of completed currency transportation services. The training data may be indicative of the frequency with which currency transportation services are requested (based on the schedule with which currency transportation services are requested). The training data may be supplemented with data indicative of costs of each currency transportation service, such that the machine-learning model may be trained to estimate currency transportation costs for various destinations and/or for various carriers. The machine-learning based model may thus be trained to predict currency transportation costs for a single currency transportation service as well as currency transportation costs for a plurality of currency transportation services that remain in compliance with applicable currency transportation requirements of a retailer.

In certain embodiments, the machine-learning model may be trained via unsupervised learning, enabling the machine-learning model to self-detect optimal features of the training data set to determine optimal considerations for assigning a particular carrier and/or a particular destination for currency transportation services.

In other embodiments, the machine-learning model may be trained via supervised learning, with a user providing user input for selecting particular features and/or conditions relevant for deciding how to assign particular carriers and/or destinations for currency transportation services.

Moreover, the monitoring server of certain embodiments stores and/or executes a plurality of machine-learning based currency transportation models to be executed in the alternative. Each of the plurality of machine-learning based currency transportation models corresponds to a single classification (e.g., a single retail location classification), such that different machine-learning based currency transportation models are utilized for different retail classifications (e.g., currency transportation services may be identified and/or assigned for rural retail locations with a first model, and currency transportation services may be identified and/or assigned for urban retail locations with a second model). In other embodiments, a single machine-learning based currency transportation model may be utilized which encompasses a consideration of the retail location classification as a factor for assigning currency transportation services in response to a currency transportation service request.

Model Execution for Route Generation

Figure 5:
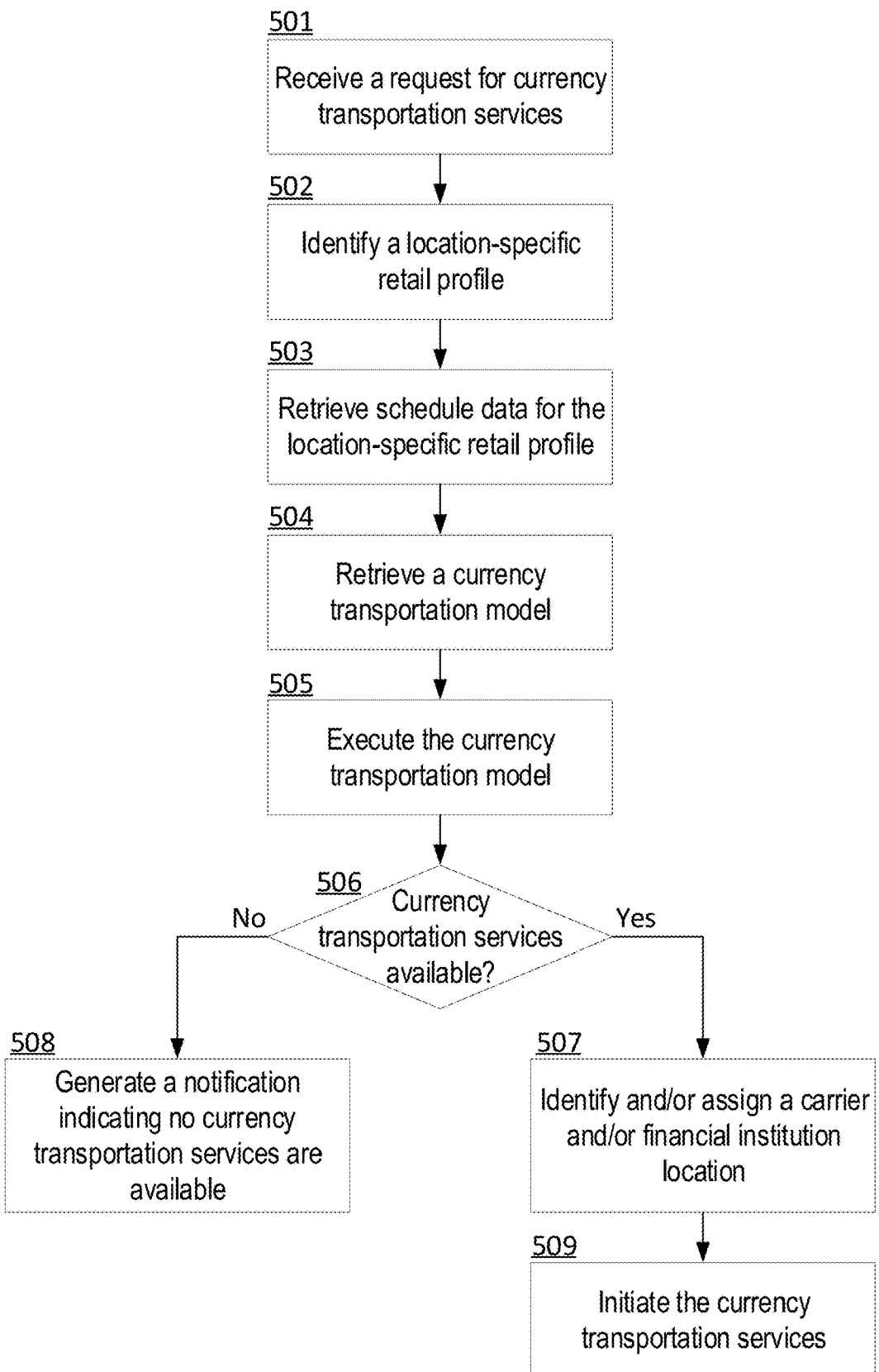
FIG. 5 is a flowchart illustrating an example process for identifying and assigning currency transportation services according to certain embodiments.

The monitoring server is configured to automatically identify and/or assign a carrier and/or a destination financial institution for a currency transportation service in response to a request for currency transportation services. FIG. 5 is a flowchart illustrating an example process for automatically identifying and/or assigning a carrier and/or a destination financial institution for currency transportation services. As shown at Block 501, a request for currency transportation services is received at the monitoring server. The request for currency transportation services may be generated at a cash handling device for a particular retail location. The request for currency transportation services may additionally or alternatively be generated at a user computing entity (e.g., manually, in response to user input).

In certain embodiments, the request for currency transportation services is generated automatically by or on behalf of a cash handling device. As discussed herein, the cash handling device is configured to automatically monitor the amount of cash stored therein, as well as the location of storage of the cash within the cash handling device. The cash handling device is configured to monitor the amount of cash stored therein on a denominational level (e.g., monitoring the quantity of $20 bills separately from the quantity of $10 bills, $5 bills, and/or other denominations). If applicable, the cash handling device is further configured to monitor the quantity of cash stored within various locations within the cash handling device. For example, the cash handling device may distinguish between cash stored within a recycler cassette (cash available for withdrawal from the cash handling device) and cash stored within a deposit cassette (cash that is unavailable for withdrawal from the cash handling device). Because the cash handling device is capable of precisely monitoring the quantity of cash stored therein, on a denominational level, the cash handling device (and/or the monitoring server, based on data transmitted from the cash handling device) is capable of determining when the quantity of cash is at or below a threshold (e.g., at or below a threshold amount of a particular denomination of cash available for withdrawal), is above a threshold (e.g., above a threshold amount of a particular denomination of cash stored within a deposit cassette, indicating that the deposit cassette is full or nearly full). In certain embodiments, the monitoring server (alone or in combination with the cash handling device transmitting data to the monitoring server) is configured to forecast the amount of cash needed (by denomination) and/or the amount of additional space within the cash handling device needed (for expected deposits of cash into the cash handling device). Based on the forecast needs of the cash handling device as well as the amount of cash stored therein, the monitoring server (and/or the cash handling device) is configured to automatically generate a request for currency transportation services.

The request for currency transportation services comprises a plurality of structed data items, identifying, for example: a date/time at which the request for currency transportation service is generated; a cash handling device (or retailer location) for which the request for currency transportation service is generated (e.g., by identifying a unique identifier associated with the cash handling device or the retail location, such as a location-specific retail profile identifier); a type of currency transportation service requested (e.g., a pick-up or a drop-off); amounts of currency, by denomination, to be picked-up or dropped-off as a part of the currency transportation services; a deadline for completion of the requested currency transportation services; and/or the like.

Upon receipt of the request for currency transportation services, the monitoring server extracts the included data identifying the relevant cash handling device, and queries accessible memory storage areas to identify a location-specific retail profile, as indicated at Block 502. As discussed above, the location-specific retail profile may encompass all relevant currency transportation requirements for the cash handling device (including location-specific currency transportation requirements and master currency transportation requirements). In other embodiments, the monitoring server may additionally utilize data within the retrieved location-specific retail profile to query the associated memory storage areas to additionally retrieve a relevant master retail profile that may provide additional currency transportation requirements.

As mentioned above, master retail profiles may comprise currency transportation requirements that are classification specific, such that certain currency transportation requirements within the master retail profile are not applicable to all location-specific retail profiles. Upon identifying a master retail profile, the monitoring server identifies one or more of the currency transportation requirements applicable to the location-specific retail profile (e.g., by matching a classification within the location-specific retail profile with a classification associated with one or more of the currency transportation requirements). Those currency transportation requirements identified as relevant to the location-specific retail profile are retrieved from the master retail profile and may be provided to the currency transportation model as a part of the data retrieved from the location-specific retail profile.

Moreover, as a part of retrieving the location-specific retail profile and/or the master retail profile, the monitoring server additionally retrieves scheduling data (as reflected at Block 503) comprising one or more of: historical data indicative of historical currency transportation services provided for the cash handling device or pending data indicative of scheduled currency transportation services for the cash handling device that have not yet been completed. The retrieved historical data and/or data indicative of scheduled currency transportation services comprise an identification of a carrier used, a destination financial institution utilized for the currency transportation services, a cash handling device involved in the currency transportation services, the quantity of cash utilized for the currency transportation services (in a denominational level), and the date/time of the currency transportation services.

In embodiments in which the monitoring server executes a plurality of currency transportation models, the monitoring server identifies a currency transportation model applicable to a particular request for currency transportation services. In certain embodiments, the currency transportation models are applicable to certain classifications, and therefore the monitoring server identifies a classification within a location-specific retail profile and retrieves a currency transportation model applicable to the identified classification, as indicated at Block 504. In embodiments in which the monitoring server is configured for executing only a single currency transportation model, the single currency transportation model is retrieved for execution based on the received request for currency transportation services.

As just one example distinction between models applicable to different identified classifications, a first model (e.g., applicable to retail locations with a "rural" classification) is configured to suggest alternative recommended days and/or times for receiving currency transportation services to change the currency transportation requirement data within the location-specific retail profile. For example, carriers may visit rural areas infrequently, and therefore suggesting that the retailer modify the location-specific currency transportation requirements to accept currency transportation services on other days and/or at other times, as carriers may be willing to provide lower cost currency transportation services if the carrier can make a single trip to the rural location to service a plurality of retailers. A second model (e.g., applicable to retail locations with an "urban" classification) does not provide the same day/time recommendation functionality as the first model, based on a model assumption that carriers operate in specific urban areas on a daily/near-daily basis, such that cost differences between different days are negligible.

In certain embodiments, at least a portion of the request for currency transportation services is provided to the currency transportation model. At least a portion of the request for currency transportation services may be provided together with data retrieved from one or more of the location-specific retail profile, the master retail profile (e.g., such as at least a portion of the currency transportation requirement data retrieved from the location-specific retail profile and/or the master retail profile), the scheduling data, and/or the like. In just one example, the currency transportation requirement data is provided to the currency transportation model together with the scheduling data. When executing the currency transportation model as indicated at Blocks 505-506, if the currency transportation model identifies one or more combinations of carriers and financial institution destinations that may be utilized for providing the currency transportation services while remaining in compliance with applicable currency transportation requirements, the currency transportation model identifies an optimal carrier and/or financial institution destination for providing the currency transportation services while maintaining compliance with relevant currency transportation requirements, as indicated at Block 507.

Even in those scenarios in which the currency transportation model identifies an optimal carrier and/or financial institution destination for providing the currency transportation services while maintaining compliance with relevant currency transportation requirements, execution of the currency transportation model additionally causes the currency transportation model to determine whether modifications to the currency transportation requirements within the location-specific retail profile and/or the master retail profile would result in significant cost savings and/or other optimizations of the currency transportation services (either for a single currency transportation request or a predicted plurality of currency transportation services requested and provided over a period of time). For example, the currency transportation model may generate an output indicating that modifying a listing of acceptable days and/or acceptable times on which currency transportation services can be provided to a retail location could result in significant cost savings over time. It should be understood that the currency transportation model may identify other potential changes to the currency transportation requirement data within location-specific retail profiles and/or master retail profiles. As mentioned previously, a single currency transportation model of a plurality of currency transportation models executable by the monitoring server may be configured to output the recommended changes to the currency transportation requirements. For example, a model executed for retail locations having a rural classification may provide the above-mentioned recommended changes to the currency transportation requirements, while a model executed for retail locations having an urban classification may not provide the above-mentioned recommended changes to the currency transportation requirements.

As indicated at Block 508, if no carrier and/or financial institution destinations are available that satisfy applicable currency transportation requirements, the monitoring server generates a notification to be provided to a user computing entity and/or the cash handling device indicating that a user should manually select a carrier and/or a financial institution destination for the requested currency transportation services. The notification may comprise a suggested carrier and/or a suggested financial institution destination for selection by a user, together with an indication that the currency transportation services will be indicated as an exception to the currency transportation requirements. In certain embodiments, the notification may comprise additional information, such as estimated costs for each of the various currency transportation service option combinations (e.g., each of the available carriers and each of the available financial institution destinations). Moreover, in certain embodiments the currency transportation model is additionally configured to generate and output recommended changes to the currency transportation requirements within the location-specific retail profile and/or the master retail profile that would enable the selection (e.g., automatic selection) of a carrier and/or a financial institution location to service as a destination for the currency transportation services, similar to that discussed above.

With reference again to Block 507, the monitoring server automatically identifies and assigns a carrier and/or a destination financial institution to satisfy the currency transportation service request. In certain embodiments, the monitoring server automatically identifies a carrier and destination financial institution to satisfy the currency transportation request, and the monitoring server may request user input confirming the identified carrier and destination financial institution prior to assigning the carrier and destination financial institution to satisfy the currency transportation service request.

To assign the carrier and/or the destination financial institution and to initiate the currency transportation services as reflected at Block 509, the monitoring server transmits a message to an external, carrier-operated computing entity requesting the carrier provide transportation services between the cash handling device involved in the request for currency transportation services and the identified destination financial institution. Communications with the external carrier computing system may be two-way communications (e.g., via corresponding APIs, JSON communication interfaces, or other communication protocols), such that the carrier computing entity may transmit a response confirming (or rejecting) the requested transportation services. Upon receipt of a confirmation of the requested transportation services from the carrier computing entity, the monitoring server transmits data indicative of the transportation services to a financial institution computing entity to inform the financial institution of the impending currency transportation services. The monitoring server additionally transmits a notification to the cash handling device and/or to a user computing entity confirming that currency transportation services have been confirmed to satisfy the currency transportation service request. The monitoring server additionally updates data indicative of scheduled currency transportation services for the cash handling device as stored in the memory storage area, such that subsequent currency transportation requests are satisfied while considering the automatically scheduled currency transportation services.

A single machine-learning model may be utilized for identifying and/or assigning carrier and/or financial institution destinations that satisfy any of a variety of currency transportation service requests (and corresponding currency transportation requirements). The single machine-learning model may be configured to comply with any of a variety of currency transportation requirements, such as selection of a particular financial institution location as a destination for currency transportation services delivering cash from the retail location (from the cash handling device) to the financial institution location. The single machine-learning model is configured to satisfy location-specific currency transportation requirements, such as currency transportation requirements enacted for a hurricane-prone geographical region, under which the currency transportation requirements dictate a maximum percentage of cash that may be transported to any single financial institution location and/or to any financial institutions within a shared geographical region (e.g., zip code, geofenced area, municipality, and/or the like). Such a limitation mitigates a risk that a particular financial institution will be unable to accept deposits due to flooding or other hurricane related damage.

The single machine-learning model is additionally configured to satisfy master currency transportation requirements, which may be implemented as requirements for currency transportation services relating to a single cash handling device or as aggregate requirements relating to currency transportation services for all cash handling devices associated with the master currency transportation requirements. Master currency transportation requirements relating to a single cash handling device may be embodied as a currency transportation requirement maintained within the master retail profile establishing a maximum percentage of currency transportation services that may be provided by a single carrier from a single cash handling device. Master currency transportation requirements embodied as aggregate requirements may be embodied as a maximum percentage of cash (in terms of overall value) that may be transported by a single carrier on behalf of the retailer, regardless of the cash handling device as a source of the currency.

Moreover, the single machine-learning model may be configured to identify and/or assign a carrier and/or a financial institution destination for currency transportation services to minimize expected overall costs of currency transportation services across a plurality of currency transportation services. As a specific example, the machine-learning model may determine that a particular carrier-destination combination results in a lower cost for a single currency transportation service, the machine-learning model may recognize that the particular carrier-destination combination would, if accepted, block lower-cost currency transportation services in the future in light of applicable currency transportation requirements. In such a scenario, the machine-learning model may select a higher-cost currency transportation service to address a particular currency transportation service request, thereby maintaining additional options for currency transportation services that are predicted to be requested in the future.

As mentioned, once the monitoring server executes the currency transportation model and initiates currency transportation services to address a request for currency transportation services, the monitoring server updates the scheduling data to reflect the newly scheduled currency transportation services for a particular location. The monitoring server is additionally configured to generate one or more reports to reflect at least a portion of the scheduling data (e.g., to reflect the pending data indicative of scheduled but uncompleted currency transportation services). The one or more reports may be location-specific reports that may be provided as a table indicating a schedule of currency transportation services, a graphical report (e.g., a map) illustrating origins and destinations for various currency transportation services relating to a single retail location, and/or the like.

In certain embodiments, the monitoring server is configured to generate one or more aggregate reports indicative of currency transportation services provided for a plurality of retail locations (e.g., a plurality of retail locations associated with a single master retail profile). Example reports are shown in FIGS. 6-7. For example, FIG. 6 is an example graphical report illustrating locations of various currency transportation services provided for a plurality of retail locations. Each illustrated line may reflect a currency transportation service, with the ends of each line reflecting the origin (e.g., the particular retail location) and the final destination (e.g., a particular financial institution location) for the currency transportation service. In certain embodiments, the graphical report may be interactive, such as enabling users to zoom in/out and/or to click on a particular line to obtain additional data regarding the associated currency transportation services.

FIG. 7 illustrates another example aggregate report that may be generated by the monitoring server. The example report of FIG. 7 provides summary data regarding currency transportation services for each of a plurality of retail locations in table form, specifically indicating the number of currency transportation services provided for a particular retail location by each of a plurality of carriers (specifically, carrier 1, carrier 2, and carrier 3). In certain embodiments, a tabular report such as that shown in FIG. 7 may be interactive when provided to a user via a graphical user interface, such that a user can select one or more entries within the chart to obtain additional information about the entries therein. For example, selecting a particular retail location may cause the monitoring server to return a graphical user interface providing additional data regarding currency transportation services associated with that location. Selecting an indication of the number of currency transportation services provided by a single carrier for a single retail location may cause the monitoring server to return a graphical user interface providing additional data regarding each of the currency transportation services provided by the selected carrier for the selected retail location.

The reports generated by the monitoring server may be generated and provided to the cash handling device and/or to one or more user interfaces. Moreover, it should be understood that the reports illustrated in FIGS. 6-7 are merely examples, and other reports, including other formats and other contents may be generated by the monitoring server in accordance with certain embodiments.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, while certain embodiments discussed herein specifically relate to automatically initiating currency transportation services from a retail location (from a cash handling device at the retail location) by identifying a carrier and a final destination for delivery of the currency to a particular financial institution location, it should be understood that certain embodiments may additionally be configured to utilize analogous currency transportation rules and currency transportation models for initiating currency transportation services for transporting currency from a financial institution location to a particular retail location. For example, the currency transportation model may identify and/or assign a carrier and an origin financial institution location for providing currency to the cash handling device at the retail location. The currency transportation model may implement identical and/or analogous currency transportation requirements relating to currency transportation services for providing currency to a cash handling device, and the currency transportation model may additionally identify and/or assign a carrier and/or original financial institution location while minimizing costs of the particular currency transportation services, to minimize aggregate costs of currency transportation services provided over time, and/or to otherwise optimize the identification and assignment of currency transportation services.

That which is claimed:

1. A computer-implemented method comprising:
receiving, via one or more processors, an automatically generated request for currency transportation services associated with a cash handling device, wherein the request for currency transportation services comprises a retail location identifier;
retrieving, from one or more memory storage areas, a location-specific retail profile comprising currency transportation requirement data associated with the cash handling device;
retrieving, based at least in part on the location-specific retail profile, scheduling data for previously scheduled currency transportation services for the cash handling device;
accessing, via the one or more processors, a selected machine-learning based currency transportation model based at least in part on the location-specific retail profile, wherein the selected machine-learning based currency transportation model is one of a plurality of accessible machine-learning based currency transportation models each applicable for different retail location characteristics and wherein each of the plurality of accessible machine-learning based currency transportation models are trained using supervised learning based at least in part on historical data from completed currency transportation services;
providing, via the one or more processors: (a) at least a portion of the request for currency transportation services, (b) at least a portion of the currency transportation requirement data, and (c) at least a portion of the scheduling data, as input to the selected machine-learning based currency transportation model for automatically initiating a currency transportation service to address the request for currency transportation services;
executing, via the one or more processors, the selected machine-learning based currency transportation model to automatically assign a carrier and a final destination for transporting currency from the cash handling device to the final destination to satisfy the request for currency transportation services, wherein the automatically assigned carrier and final destination comply with the at least a portion of the currency transportation requirement data and wherein the carrier is selected from a plurality of whitelisted carriers each having a respective carrier-operated computing entity;
transmitting, via the one or more processors, a notification for provision to the respective carrier-operated computing entity of the automatically assigned carrier to initiate the currency transportation service by a representative of the carrier; and
updating, via the one or more processors, the scheduling data based at least in part on the currency transportation service.

2. The computer-implemented method of claim 1, further comprising:
retrieving, based at least in part on the location-specific retail profile, a master retail profile comprising additional currency transportation requirement data; and
wherein the automatically assigned carrier and final destination comply with the additional currency transportation requirement data.

3. The computer-implemented method of claim 2, wherein the additional currency transportation requirement data comprises aggregate currency transportation requirement data establishing currency transportation requirements for currency transportation services provided for a plurality of retail locations; and
wherein retrieving scheduling data for previously scheduled currency transportation services for the cash handling device additionally comprises retrieving scheduling data for previously scheduled currency transportation services for each of the plurality of retail locations.

4. The computer-implemented method of claim 3, wherein the additional currency transportation requirement

39 data identifies a maximum percentage of currency transported from the plurality of retail locations by a single carrier.

5. The computer-implemented method of claim 1, wherein the currency transportation requirement data identifies a maximum percentage of currency transported from the cash handling device to a single final destination.

6. The computer-implemented method of claim 1, wherein the currency transportation requirement data identifies a maximum percentage of currency transported from the cash handling device to final destinations located within a defined geographical area.

7. The computer-implemented method of claim 1, wherein the scheduling data comprises historical data identifying previously completed currency transportation services and pending data identifying uncompleted currency transportation services.

8. The computer-implemented method of claim 1, wherein the selected machine-learning based currency transportation model is configured to predict future currency transportation service requests and to minimize transportation costs across a plurality of currency transportation services from the cash handling device based at least in part on the predicted future currency transportation service requests and the currency transportation service request.

9. The computer-implemented method of claim 1, further comprising providing one or more carrier profiles as input to the selected machine-learning based currency transportation model, wherein the one or more carrier profiles comprise routing data indicative of one or more existing carrier routes.

10. The computer-implemented method of claim 1, further comprising transmitting a notification for provision to the cash handling device confirming the currency transportation service.

11. A system comprising:
one or more memory storage areas; and
one or more processors collectively configured to:
receive an automatically generated request for currency transportation services associated with a cash handling device, wherein the request for currency transportation services comprises a retail location identifier;
retrieve, from the one or more memory storage areas, a location-specific retail profile comprising currency transportation requirement data associated with the cash handling device;
retrieve, based at least in part on the location-specific retail profile, scheduling data for previously scheduled currency transportation services for the cash handling device;
access, a selected machine-learning based currency transportation model based at least in part on the location-specific retail profile, wherein the selected machine-learning based currency transportation model is one of a plurality of accessible machine-learning based currency transportation models each applicable for different retail location characteristics and wherein each of the plurality of accessible machine-learning based currency transportation models are trained using supervised learning based at least in part on historical data from completed currency transportation services;
provide (a) at least a portion of the request for currency transportation services, (b) at least a portion of the currency transportation requirement data, and (c) at least a portion of the scheduling data, as input to the selected machine-learning based currency transportation model for automatically initiating a currency transportation service to address the request for currency transportation services;
execute the selected machine-learning based currency transportation model to automatically assign a carrier and a final destination for transporting currency from the cash handling device to the final destination to satisfy the request for currency transportation services, wherein the automatically assigned carrier and final destination comply with the at least a portion of the currency transportation requirement data and wherein the carrier is selected from a plurality of whitelisted carriers each having a respective carrier-operated computing entity;
transmit a notification for provision to the respective carrier-operated computing entity of the automatically assigned carrier to initiate the currency transportation service by a representative of the carrier; and
update the scheduling data based at least in part on the currency transportation service.

12. The system of claim 11, wherein the one or more processors are further configured to:
retrieve, based at least in part on the location-specific retail profile, a master retail profile comprising additional currency transportation requirement data; and
wherein the automatically assigned carrier and final destination comply with the additional currency transportation requirement data.

13. The system of claim 12, wherein the additional currency transportation requirement data comprises aggregate currency transportation requirement data establishing currency transportation requirements for currency transportation services provided for a plurality of retail locations; and
wherein retrieving scheduling data for previously scheduled currency transportation services for the cash handling device additionally comprises retrieving scheduling data for previously scheduled currency transportation services for each of the plurality of retail locations.

14. The system of claim 13, wherein the additional currency transportation requirement data identifies a maximum percentage of currency transported from the plurality of retail locations by a single carrier.

15. The system of claim 11, wherein the currency transportation requirement data identifies a maximum percentage of currency transported from the cash handling device to a single final destination.

16. The system of claim 11, wherein the currency transportation requirement data identifies a maximum percentage of currency transported from the cash handling device to final destinations located within a defined geographical area.

17. The system of claim 11, wherein the scheduling data comprises historical data identifying previously completed currency transportation services and pending data identifying uncompleted currency transportation services.

18. The system of claim 11, wherein the selected machine-learning based currency transportation model is configured to predict future currency transportation service requests and to minimize transportation costs across a plurality of currency transportation services from the cash handling device based at least in part on the predicted future currency transportation service requests and the currency transportation service request.

19. A computer program product comprising a non-transitory computer readable medium having computer program instructions stored therein, the computer program instructions when executed by a processor, cause the processor to:
- receive an automatically generated request for currency transportation services associated with a cash handling device, wherein the request for currency transportation services comprises a retail location identifier;
- retrieve, from one or more memory storage areas, a location-specific retail profile comprising currency transportation requirement data associated with the cash handling device;
- retrieve, based at least in part on the location-specific retail profile, scheduling data for previously scheduled currency transportation services for the cash handling device;
- access a selected machine-learning based currency transportation model based at least in part on the location-specific retail profile, wherein the selected machine-learning based currency transportation model is one of a plurality of accessible machine-learning based currency transportation models each applicable for different retail location characteristics and wherein each of the plurality of accessible machine-learning based currency transportation models are trained using supervised learning based at least in part on historical data from completed currency transportation services;
- provide (a) at least a portion of the request for currency transportation services, (b) at least a portion of the currency transportation requirement data, and (c) at least a portion of the scheduling data, as input to the selected machine-learning based currency transportation model for automatically initiating a currency transportation service to address the request for currency transportation services;
- execute the selected machine-learning based currency transportation model to automatically assign a carrier and a final destination for transporting currency from the cash handling device to the final destination to satisfy the request for currency transportation services, wherein the automatically assigned carrier and final destination comply with the at least a portion of the currency transportation requirement data and wherein the carrier is selected from a plurality of whitelisted carriers each having a respective carrier-operated computing entity;
- transmit a notification for provision to the respective carrier-operated computing entity of the automatically assigned carrier to initiate the currency transportation service by a representative of the carrier; and
- update the scheduling data based at least in part on the currency transportation service.

20. The computer program product of claim 19, wherein the computer program instructions when executed by a processor, further cause the processor to:
- retrieve, based at least in part on the location-specific retail profile, a master retail profile comprising additional currency transportation requirement data; and
- wherein the automatically assigned carrier and final destination comply with the additional currency transportation requirement data.

21. The computer program product of claim 20, wherein the additional currency transportation requirement data comprises aggregate currency transportation requirement data establishing currency transportation requirements for currency transportation services provided for a plurality of retail locations; and
- wherein retrieving scheduling data for previously scheduled currency transportation services for the cash handling device additionally comprises retrieving scheduling data for previously scheduled currency transportation services for each of the plurality of retail locations.

* * * * *